(12) United States Patent
Thannhauser

(10) Patent No.: US 11,834,337 B2
(45) Date of Patent: Dec. 5, 2023

(54) METHOD AND DEVICE FOR PRODUCING ACTIVE CARBON

(71) Applicant: Concord Blue Patent GmbH, Dusseldorf (DE)

(72) Inventor: Christopher Thannhauser, Dusseldorf (DE)

(73) Assignee: Concord Blue Patent GmbH, Dusseldorf (DE)

( * ) Notice: Subject to any disclaimer, the term of this patent is extended or adjusted under 35 U.S.C. 154(b) by 558 days.

(21) Appl. No.: 17/261,318

(22) PCT Filed: Jul. 15, 2019

(86) PCT No.: PCT/EP2019/069021
§ 371 (c)(1),
(2) Date: Jan. 19, 2021

(87) PCT Pub. No.: WO2020/016183
PCT Pub. Date: Jan. 23, 2020

(65) Prior Publication Data
US 2021/0340014 A1  Nov. 4, 2021

(30) Foreign Application Priority Data
Jul. 20, 2018 (DE) .......................... 102018117674.0

(51) Int. Cl.
*C01B 32/336* (2017.01)
*C01B 32/318* (2017.01)
*C01B 32/39* (2017.01)

(52) U.S. Cl.
CPC .......... *C01B 32/336* (2017.08); *C01B 32/318* (2017.08); *C01B 32/39* (2017.08)

(58) Field of Classification Search
CPC ..... C01B 32/336; C01B 32/318; C01B 32/39; C01B 32/312; Y02E 50/10
See application file for complete search history.

(56) References Cited

FOREIGN PATENT DOCUMENTS

| DE | 19936524 | * | 2/2001 | ............. B01D 53/34 |
|----|----------|---|--------|---------|
| DE | 19936524 A1 | | 2/2001 | |
| DE | 69703945 T2 | | 8/2001 | |
| DE | 102007047931 A1 | | 7/2009 | |
| DE | 102008027858 A1 | | 12/2009 | |

(Continued)

OTHER PUBLICATIONS

Machine Translation of DE 19936524 to Matrmawi (B01D 53/34; Feb. 2001) (Year: 2001).*

(Continued)

*Primary Examiner* — Daniel C. McCracken
(74) *Attorney, Agent, or Firm* — Wood Herron & Evans LLP

(57) ABSTRACT

A method and a device are provided for producing activated carbon in a gasification process. A first process stage includes thermally decomposing a carbonaceous starting material, in particular biomass, in a first reaction zone to produce pyrolysis coke and pyrolysis gas. A second process stage includes generating, from the pyrolysis gas in the second reaction zone, a product gas which can be used for activating the pyrolysis coke. A third process stage includes activating at least a portion of the pyrolysis coke to form activated carbon with the aid of the product gas in the third reaction zone.

19 Claims, 3 Drawing Sheets

(56) References Cited

FOREIGN PATENT DOCUMENTS

| | | |
|---|---|---|
| EP | 3088492 A1 | 11/2016 |
| WO | 2016174006 A1 | 11/2016 |
| WO | 2019104382 A1 | 6/2019 |

OTHER PUBLICATIONS

International Searching Authority, International Preliminary Report on Patentability issued in PCT/EP2019/069021 dated Apr. 12, 2021 with English translation (12 pages).
Jain, Akshay, et al., "Production of high surface area mesoporous activated carbons from waste biomass using hydrogen peroxide-mediated hydrothermal treatment for adsorption applications," Chemical Engineering Journal, vol. 273, dated Mar. 28, 2015 (8 pages).
International Searching Authority, Search Report and Written Opinion issued in PCT/EP2019/069021 dated Oct. 8, 2019 with partial English translation (16 pages).
International Searching Authority, Written Opinion issued in PCT/EP2019/069021 dated Aug. 12, 2020 (5 pages).

* cited by examiner

METHOD AND DEVICE FOR PRODUCING ACTIVE CARBON

CROSS-REFERENCE TO RELATED APPLICATIONS

This application is a national phase entry of, and claims priority to, International Application No. PCT/EP2019/069021, filed Jul. 15, 2019, which claims priority to German Patent Application No. DE 10 2018 117 674.0, filed Jul. 20, 2018. The above-mentioned patent applications are incorporated herein by reference in their entireties.

TECHNICAL FIELD

This application relates to a method and a device for producing activated carbon in a gasification process.

BACKGROUND

Due to limited availability of resources and a steadily growing energy demand, waste materials are increasingly being recycled. In this regard, there are various approaches to sustainably recycle these waste materials, for example biomass, plastic waste, residual waste and/or the like. For example, pyrolysis methods are known that allow clean, renewable energy to be generated from waste materials. In the context of thermal decomposition of organic materials, isolated gaseous components can, for example, be processed and burned or used, in terms of their material, as a product gas, as it is referred to, for the generation of energy. In this context, the energy content of further by-products generated during the course of the decomposition of the waste materials or the processing of the gaseous components can be used to maintain the decomposition or the processing, for example by the further by-products being burned and the heat energy obtained as a result being used for the thermal decomposition of the organic materials. Alternatively, such by-products can also be further processed externally and otherwise used, in terms of their material.

A method and a device for the thermolytic processing of polymer-containing and cellulose-containing materials, in particular light shredder residues, is known from DE 199 36 524 A1. The polymer-containing and cellulose-containing materials are fed, together with a nitrogen-containing additive-catalyst mixture, to a heated main reactor and are decomposed into carbonization coke and carbonization gas by heating to a temperature of from 350 to 600° C. The carbonization coke is treated with the carbonization gas in an after-treatment reactor at temperatures of from 360 to 600° C., further degassed and activated by the water vapor which is contained in the carbonization gas.

It would thus be desirable to further improve the utilization of waste materials and, in particular, to make such utilization more efficient.

SUMMARY

To address these and other problems with the conventional designs, a method for activating activated carbon within a gasification process is provided. The method includes (i) a first process stage including thermally decomposing a carbonaceous starting material, in particular biomass, in a first reaction zone, to produce pyrolysis coke and pyrolysis gas; (ii) transferring at least a portion of the produced pyrolysis gas from the first reaction zone to a second reaction zone and transferring at least a portion of the pyrolysis coke from the first reaction zone to a third reaction zone; (iii) a second process stage including generating, from the pyrolysis gas in the second reaction zone, a product gas which can be used for activating the pyrolysis coke; (iv) transferring the product gas to the third reaction zone; and (v) a third process stage including activating at least a portion of the pyrolysis coke to form activated carbon with the aid of the product gas in the third reaction zone.

In contrast to conventional methods, in which the pyrolysis coke remaining during the thermal decomposition process of the starting material in the first process stage is also combusted or is removed and burned in order to provide the heat demand of the decomposition process, for example in a multi-component burner, the pyrolysis coke can, in accordance with the invention, be processed and used as activated carbon with a wide range of applications. In this case, the processing preferably takes place, in a third process stage, immediately after the generation of the product gas in the second process stage, i.e. after processing of the pyrolysis gas. This is therefore also referred to as an integrated activation process.

In this way, embodiments of the invention advantageously enable the combined generation, in particular the at least substantially simultaneous generation, of an energy-rich product gas, which can, for example, be burned in order to generate electricity and/or heat, and of activated carbon, which can be used elsewhere, for example, as an adsorbent for filtering purposes or as a carrier material for catalysts. In this context, the production of activated carbon in accordance with the invention is particularly efficient because, in contrast to conventional approaches, the product gas, which is preferably produced immediately beforehand, is used for this purpose. As a result of this, it is not necessary to carry out a separate activation of the pyrolysis coke produced during generation of the product gas from the starting material in costly and energy-intensive external processes.

In accordance with the invention, the physical activation of the activated carbon can be carried out particularly reliably and efficiently since the product gas, after the second process stage, i.e. after the separate processing of the pyrolysis gas in the second reaction zone, is rich in gas components which have a high activation potential, for example water vapor and/or carbon dioxide. For this purpose, the processing includes, for example, steam reforming. This eliminates the need for the separate or external, in general energy-intensive, provision of an activation gas specially made for activation.

In addition, the thermal energy which is contained in the product gas, which remains unused in conventional methods, can be utilized in the course of the activation and in this way enable, or at least support, the activation. The provision of further energy required for activation can thus be rendered unnecessary or at least be reduced. The invention in several embodiments therefore makes a particularly efficient utilization of the product gas possible, in particular a multi-stage utilization.

Overall, the invention in several embodiments makes an improved utilization, in particular a more efficient utilization, of carbonaceous starting material, in particular biomass, possible.

In the following, certain preferred embodiments of the invention and further developments thereof will be described, each of which, as far as this is not expressly excluded, can be combined in any desired manner with one another, as well as with the other embodiments of the invention which are described below.

In some embodiments, the heat energy which is required for the activation of the pyrolysis coke is provided at least in part, and preferably exclusively, by the product gas. In this case, the pyrolysis coke does not need to be heated separately to an activation temperature, or only to a small extent, but can instead be heated at least partially, and preferably exclusively, by the product gas. For this purpose, the pyrolysis coke can be activated in thermal isolation, e.g., in a thermally isolated third reaction zone, so that the heat energy provided by the product gas does not dissipate, or at least dissipates only to a small extent, in the third reaction zone. A particularly efficient production of activated carbon from the pyrolysis coke produced in the first process stage is made possible by this.

By the separate generation of the product gas in the second reaction zone, preferably in the course of a homogeneous gas phase reaction, in particular steam reforming, the product gas can have a temperature level which is particularly suitable for the physical activation of the pyrolysis coke. For example, the reforming of the pyrolysis gas can take place at about 950 C, so that the thermal energy which is contained in the product gas and which is supplied in the course of the second process stage, is sufficient to bring about the activation. Therefore, as a rule, it is not necessary to provide additional heat in the third reaction zone.

As an alternative, or in addition, however, at least part of the heat energy which is required for the activation can also be introduced into the third reaction zone in another way, for example by external heating. For example, it is conceivable to burn part of the pyrolysis coke and to feed the heat generated in the process to the third reaction zone. Although this reduces the amount of activated carbon that can be produced, it enables a particularly stable activation temperature in the third reaction zone to be achieved, and therefore a particularly reliable activation of the pyrolysis coke fed to the third reaction zone, i.e. a particularly high activation efficiency.

In some embodiments, the pyrolysis coke is activated at an activation temperature that is dependent on a generation temperature during generation of the product gas and which, in particular, is at least substantially defined by the generation temperature. In particular, the activation temperature may correspond, at least substantially, to the generation temperature. For this purpose, the third reaction zone may be arranged in the vicinity of, in particular directly adjacent to, the second reaction zone, so that a short gas-conducting connection for transferring the product gas between the second and third reaction zones can be established or exists. Here, preferably, the gas-conducting connection is thermally insulated in order to avoid, or at least reduce, dissipation of heat during the transfer. By this, it is possible to control the activation conditions in the third reaction zone by adjusting the generation temperature, i.e. the conditions prevailing during the generation of the product gas from the pyrolysis gas. This simplifies the realization of the overall process.

In a preferred manner, the activation temperature in the third reaction zone is coupled to the generation temperature in the second reaction zone in such a way that the activation temperature is 100° C. or less, preferably 50° C. or less, in particular 25° C. or less, below the generation temperature. As a result of this, a particularly efficient use of the energy employed in producing the product gas from the pyrolysis coke is made possible.

In some embodiments, the product gas is generated at a generation temperature that is between 700 and 1200° C., preferably between 800 and 1000° C., in particular between 925 and 975° C. In addition to a reliable, in particular at least substantially complete, conversion of the pyrolysis gas into product gas, a particularly fast and/or reliable, in particular at least substantially complete, conversion of the pyrolysis coke in the third reaction zone is also made possible by this generation temperature. Here, and in the following, a complete conversion of the pyrolysis coke is intended to be understood to mean a uniform activation of the pyrolysis coke to activated carbon.

To reach the generation temperature, the pyrolysis gas can be subjected to a heat exchange process in the second reaction zone, in which heat energy is, in a preferred manner, transferred from a solid, such as a heat transfer medium, to the pyrolysis gas. In particular, additional heat energy can be introduced in this way until the desired generation temperature has been reached.

For example, the generation temperature can be reached by introducing a heat transfer medium which has been preheated to a defined temperature, in particular consisting of shape-retaining particles such as steel balls, into the second reaction zone. The heat transfer medium can pass through the second reaction zone in the form of a moving bed, whereby the pyrolysis gas transferred from the first reaction zone to the second reaction zone can flow therethrough, preferably in a countercurrent direction. The pyrolysis gas is thereby converted into the product gas. In this process, the temperature of the product gas generated can reliably be adjusted.

In some embodiments, water vapor is added to the pyrolysis gas, with the aid of which the product gas is generated in the second reaction zone. In this way, steam reforming of the pyrolysis gas can be achieved. In this context, the amount of water vapor added can be chosen in such a way that the product gas generated has a high water vapor content as a result of this, such as more than 15% by volume, in particular more than 25% by volume, as a result of which long-chain hydrocarbon molecules in the product gas can preferably be completely thermally decomposed into short-chain molecules. Not only can the product gas thus produced be advantageously combusted in order to generate energy, but the pyrolysis coke in the third process stage can also be converted particularly reliably into activated carbon, in particular at least substantially completely.

Preferably, the water vapor is introduced into the first reaction zone for this purpose. This enables an improvement in the convective heat transfer and/or a good mixing of pyrolysis gas and water vapor to be achieved.

Alternatively, however, the water vapor can also be introduced into the second reaction zone. This enables a particularly targeted mixing of pyrolysis gas and water vapor to be achieved, in particular at a generation temperature which is higher when compared with the pyrolysis temperature prevailing in the first reaction zone, and which is particularly favorable for steam reforming.

For this purpose, the water vapor is preferably provided external to the first and/or the second reaction zone, e.g., produced in a steam generator, and is introduced into the first reaction zone. In this way, temperature control in the first reaction zone can be facilitated or the temperature can be kept stable. Alternatively, however, water can also be introduced into the first or the second reaction zone, which water is converted into water vapor due to the pyrolysis temperature prevailing in the first or the second reaction zone. In particular, the water vapor may at least partially be contained in the carbonaceous starting material, in particular in the biomass, and may be released during the course of thermal decomposition. As a result, the energy which is used for the thermal decomposition of the starting material or for the generation of the product gas can be used particularly efficiently.

In some embodiments, the water vapor is added and/or the generation temperature is chosen in such a way that the product gas comprises at least one of the following: (i) a water vapor content of between 15 and 45% by volume, preferably of between 20 and 40% by volume, in particular of about 30% by volume; (ii) a carbon dioxide content of between 5 and 30% by volume, preferably of between 10 and 20% by volume, in particular of about 15% by volume; and/or (iii) a carbon monoxide content of between 10 and 30% by volume, preferably of between 15 and 25% by volume, in particular of about 20% by volume. This can ensure that the product gas generated can, on the one hand, efficiently be combusted for the generation of energy and, on the other hand, that it can be used for the particularly reliable conversion, in particular for the at least substantially complete, conversion of the pyrolysis coke. This is because the water vapor which is preferably contained in the product gas, and the carbon dioxide which is preferably contained in the product gas both exhibit, either individually or in combination with one another, an activation potential with respect to the activation of pyrolysis coke, whereby the ranges specified under (i) and (ii) correspond to particularly advantageous gas properties for the activation. The carbon monoxide, which is preferably also contained in the product gas, enables particularly pure activated carbon to be produced from the pyrolysis coke, in particular when present within the range indicated under (iii).

In a preferred manner, the addition of the water vapor and/or the generation temperature are controlled in such a way that at least one of the properties of the product gas mentioned above under (i) to (iii) is achieved. In other words, the composition of the product gas can be adjusted by controlled addition of the water vapor and/or control of the generation temperature, e.g., by metered supply of the preheated heat transfer medium.

Preferably, the amount of the added water vapor is controlled and/or the timing of the addition is adjusted in dependence upon the desired properties of the product gas. The control of the generation temperature can include maintaining the temperature for a predetermined period of time and, alternatively or additionally, running temperature ramps. By this, the generation of the product gas in the second reaction zone can be precisely matched to the activation of the pyrolysis coke in the third reaction zone.

By the addition of water vapor and/or the selection of the generation temperature, production conditions can be set in the second reaction zone which allow the production of a particularly low-tar product gas, which subsequently allows activated carbon of a high quality to be produced.

In some embodiments, at least a portion of the water vapor is already added in the first reaction zone during the thermal decomposition, so that partially activated pyrolysis coke is produced which is at least predominantly, preferably at least substantially completely, activated in the third reaction zone with the aid of the product gas. The activation process in the third reaction zone by the product gas is thus facilitated and can accordingly be carried out particularly reliably.

The water vapor can, for example, be fed into the first reaction zone together with the carbonaceous starting material, in particular at the same time. If necessary, water can also be introduced into the first reaction zone with the starting material, which water then evaporates. In this way it is possible to ensure that the water vapor comes into direct contact with the decomposition products of the starting material.

In some embodiments, the pyrolysis coke is partially activated with the aid of the added water vapor in the first reaction zone at a temperature which is defined by a pyrolysis temperature at which the starting material is thermally decomposed, in particular at a temperature which corresponds to the pyrolysis temperature, or which at least depends on the pyrolysis temperature. Preferably, the water vapor is supplied below the starting material in the first reaction zone for this purpose, so that it flows around or through the starting material during the course of the thermal decomposition of the latter, before it mixes with the pyrolysis gas formed in the process and is transferred to the second reaction zone. As a result of this, the pyrolysis coke does not cool down until partial activation, and a particularly comprehensive partial activation of the pyrolysis coke is made possible.

In some embodiments, the starting material is decomposed in the first reaction zone at a pyrolysis temperature that is between 300 and 900° C., preferably between 600 and 800° C., in particular between 650 and 750° C. In addition to a reliable, in particular at least substantially complete, decomposition of the starting material into pyrolysis coke and pyrolysis gas, this pyrolysis temperature also makes a particularly reliable, in particular comprehensive, partial activation of the pyrolysis coke in the first reaction zone possible.

Advantageously, it is possible to determine at least in part the properties of the activated carbon produced later in the third reaction zone by selecting the pyrolysis temperature at which the pyrolysis coke is partially activated and, if applicable, also by controlling the addition of the water vapor. It is conceivable, for example, to adjust the partial activation in dependence upon the amount of pyrolysis coke to be activated later, so that it can be ensured that the product gas stream generated in the second reaction zone, i.e. the amount of product gas generated per unit of time, is sufficient to convert the partially activated pyrolysis coke completely into activated carbon in the third reaction zone.

In some embodiments, at least a portion of the pyrolysis coke is preconditioned during the transfer to the third reaction zone. In particular, a portion of the pyrolysis coke produced in the first reaction zone can be discharged from the first reaction zone and mixed with a binding agent before it is introduced into the third reaction zone for activation. Alternatively or additionally, the pyrolysis coke which has been discharged and, if applicable, mixed with a binding agent can also be converted, in a shaping step, into a predetermined shape, for example pressed into pellets, before it is introduced into the third reaction zone for activation. The pyrolysis coke which has been preconditioned in this way can be activated particularly effectively, in particular completely, in the third reaction zone.

In some embodiments, the pyrolysis coke is continuously, or at least substantially continuously, mixed with the product gas in the third reaction zone during the activation. For this purpose, a fluidized bed of product gas can be provided in the third reaction zone which mixes the pyrolysis coke or at least contributes to its mixing. In particular, the product gas can, for this purpose, be introduced, such as injected, into the third reaction zone in such a way that the fluidized bed is formed. As an alternative to this, the pyrolysis coke can be received in a drum through which the product gas can flow, and the drum may be rotated for the purpose of mixing the pyrolysis coke, in particular for the purpose of mixing the pyrolysis coke with the product gas. By this, pyrolysis gas can flow completely, or at least substantially completely, around the pyrolysis coke so that at least a major part of the pyrolysis coke to be activated, in particular a major part of its surface, comes into contact with the pyrolysis gas.

Alternatively or additionally, the mixing of the pyrolysis coke can also be achieved, at least substantially, during the feeding of the pyrolysis coke into the third reaction zone. For example, it is conceivable to pour the pyrolysis coke onto a conveying device of the third reaction zone, in particular onto a moving bed, in such a way that the pyrolysis coke can mix, in particular with the product gas, in free fall.

In some embodiments, the product gas is conveyed through the third reaction zone in a countercurrent manner with respect to the pyrolysis coke. For example, the product gas may flow through the third reaction zone in a direction which is opposite to a conveying direction in which the pyrolysis coke is conveyed through the third reaction zone. It is conceivable, for example, to have the product gas sweep over a conveying device of the third reaction zone, in particular a moving bed of a moving bed reactor, counter to the conveying direction. A particularly good heat transfer from product gas to pyrolysis coke within the third reaction zone is made possible by directing the product gas in a countercurrent manner through the third reaction zone.

Preferably, the pyrolysis coke is fed to the third reaction zone in an entry region. In an exit region, the activated carbon produced from the pyrolysis coke can be discharged from the third reaction zone. In a preferred manner, the product gas is supplied to the third reaction zone via an inlet opening in the exit region and is discharged again via an outlet opening in the entry region after activation of the pyrolysis coke. In this context, the product gas can be transferred to the exit region via a connection between the inlet opening and the second reaction zone. By this, the activated carbon discharged from the third reaction zone in the exit region once again comes into contact with hot product gas, which may have a high water vapor content, carbon dioxide content and/or carbon monoxide content, as a result of which an at least near complete conversion, in particular a substantially uniform activation, of the pyrolysis coke can be ensured.

The pyrolysis coke entering into the third reaction zone in the entry region, on the other hand, may first come into contact with product gas which, if applicable, may be slightly cooled in comparison to this and which, if applicable, may also have a reduced water vapor content, carbon dioxide content and/or carbon monoxide content in comparison to this.

As an alternative to the countercurrent flow, however, the product gas can also be passed through the third reaction zone in co-current flow or cross-current flow, i.e. at least substantially along, or perpendicular, to a transport direction of the pyrolysis coke through the third reaction zone.

In some embodiments, after the activation of the pyrolysis coke, the product gas is passed through a separating device, where it is purified, in particular by a physical device, to remove pyrolysis coke residues and/or activated carbon residues. Particles contained in the product gas can be separated, for example, by utilizing centrifugal force, such as in a separating device configured as a cyclone. The purified product gas can, if applicable after further purification steps, in particular chemical purification steps, be burned in order to generate energy, or used, in terms of its material.

The pyrolysis coke residues and/or activated carbon residues which have been filtered from the product gas stream are preferably transferred back to the third reaction zone. This allows the pyrolysis coke produced to be converted preferably completely into activated carbon.

In some embodiments, a portion of the pyrolysis coke is combusted in a heating device in order to heat a heat transfer medium that is supplied to the second reaction zone for the generation of the product gas and/or to the first reaction zone for the thermal decomposition of the starting material. In this context, the portion of the pyrolysis coke to be combusted is preferably determined as a function of an amount of pyrolysis coke that can be activated by the product gas generated. The pyrolysis coke produced in the course of the thermal decomposition can thus be used particularly efficiently, in particular completely.

Alternatively or additionally, it is also conceivable to discharge a portion of the pyrolysis coke, which may be partially activated, and to make some other use of it, in terms of its material, for example as biochar. In this context, the portion of the pyrolysis coke to be discharged is preferably determined as a function of an amount of pyrolysis coke that can be activated by the product gas generated. The pyrolysis coke produced in the course of the thermal decomposition can thus be used particularly efficiently, in particular completely.

A second embodiment of the invention includes a device for producing activated carbon, which is arranged to carry out a method as described above. An alternative or additional utilization, in terms of the material, of the pyrolysis coke which is produced in the course of the thermal decomposition of the starting material is made possible with such a device, in contrast to conventional systems in which the pyrolysis coke is exclusively combusted or even remains unused.

In a preferred embodiment, the device has a first reaction zone in which pyrolysis coke and pyrolysis gas can be produced by thermal decomposition of carbonaceous starting material, in particular biomass. A second reaction zone is connected to the first reaction zone in a gas-conducting manner and is arranged to generate, from at least a portion of the pyrolysis gas, a product gas which can be used for the activation of the pyrolysis coke. In a third reaction zone, which is connected to the second reaction zone in a gas-conducting manner, at least a portion of the pyrolysis coke can be processed into activated carbon with the aid of the product gas. In addition, a first conveying device is arranged to transfer at least a portion of the pyrolysis coke from the first reaction zone to the third reaction zone.

The first and second reaction zones can preferably be filled with a heat transfer medium via which the pyrolysis temperature which is necessary for the thermal decomposition, or the generation temperature which is necessary for generating product gas from the pyrolysis gas, is reached. In a preferred manner, for this purpose, the device has a heating zone which is set up for heating the heat transfer medium and which can be heated, in particular by a heating device. Here, the first reaction zone is preferably arranged below the second reaction zone, which in turn is arranged below the heating zone. The heated heat transfer medium, in particular the heat transfer medium heated to the generation temperature, can then simply be transferred, by using the force of gravity, to the second reaction zone, where the pyrolysis gas flows around it. In the course of this, the heat transfer medium further cools down to the pyrolysis temperature and can then simply be transferred to the first reaction zone, again using the force of gravity.

The first reaction zone is preferably set up to mix the heat transfer medium with the carbonaceous starting material to ensure a complete thermal decomposition of the starting material. After the starting material has been decomposed into pyrolysis coke and pyrolysis gas, which preferably flows into the second reaction zone, the pyrolysis coke can be separated from the heat transfer medium in a separation zone and can be transferred to the third reaction zone by the first conveying device, for example a screw conveyor. The separated heat transfer material is preferably transported back to the heating zone by a further, second conveying device.

In a preferred manner, the third reaction zone can be configured as a rotary drum reactor which comprises a rotatably mounted drum and which is arranged to rotate the drum for mixing the pyrolysis coke received by it. Alternatively, however, the third reaction zone can also be constructed in a different manner, for example as a moving bed reactor with a conveying device, in which moving bed reactor the product gas can sweep over the pyrolysis coke transported with the aid of the conveying device.

The features and advantages which have been described in relation to the method embodiments also apply, at least where this makes technical sense, to the device embodiments, as well as vice versa.

BRIEF DESCRIPTION OF THE DRAWINGS

Further features, advantages and possible applications of the present invention will be apparent from the following description in connection with the figures, in which the same reference signs are used throughout for the same or mutually corresponding elements of the invention. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
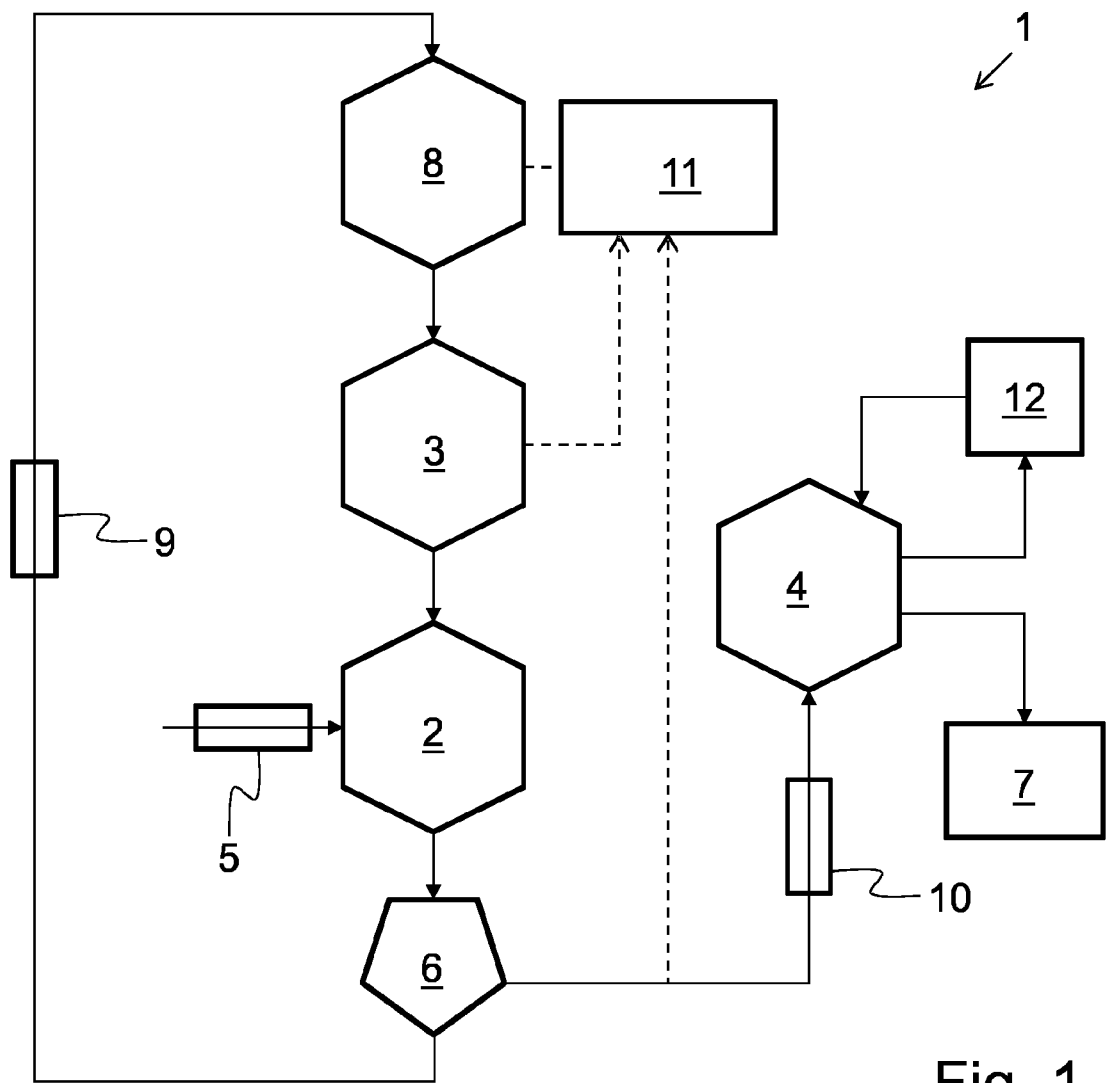
FIG. 1 is a schematic view of a first embodiment of a device for producing activated carbon.

FIG. 1 shows a first example embodiment of a device 1 for the production of activated carbon comprising a first reaction zone 2, in which a carbonaceous starting material can be thermally decomposed, a second reaction zone 3, in which a product gas can be generated from a pyrolysis gas produced in the course of the thermal decomposition, and a third reaction zone 4, in which pyrolysis coke produced in the course of the thermal decomposition can be activated by the product gas. The conveying paths of solids, in particular solid reactants or products, between the individual components of the device 1 are indicated by arrows.

The carbonaceous starting material, for example biomass or carbonaceous residues, is preferably transferred from a reservoir to the first reaction zone 2 by a conveyor system 5, either actively or passively, for example by a conveyor belt or a screw conveyor or a downwardly inclined shaft. In this context, the reservoir can be formed by a container, a storage hall and/or a storage pile from which the starting material is actively removed or from which the starting material flows or slides out passively.

Advantageously, the conveyor system 5 is arranged to preheat the conveyed starting material before it is introduced into the first reaction zone 2 in order to facilitate the thermal decomposition in the first reaction zone 2. Alternatively or additionally, the first conveyor system 5 may also be arranged to connect a drying device for drying the starting material to the first reaction zone 2. Furthermore, it is conceivable to construct the conveyor system 5 as a drying device so that the starting material is dried while it is fed to the first reaction zone 2.

In a preferred manner, the first reaction zone 2 is constructed as a shaft which can be heated from the inside, in particular a cylindrical shaft, into which a heat transfer medium can be introduced in addition to the starting material. The heat transfer medium is preheated, as described further below, and causes a pyrolysis temperature between 500 and 900° C. to be achieved, preferably between 600 and 800° C., in particular between 650 and 750° C. within the first reaction zone 2.

In this context, the second reaction zone 3 is advantageously arranged above the first reaction zone 2, so that the heat transfer medium can be introduced into the first reaction zone 2 by using the force of gravity, i.e. without any active conveying device.

In the course of the introduction of the starting material and the heat transfer medium, for example via a respective lock arranged in the upper region of the shaft, the starting material and the heat transfer medium mix, in a preferred manner. This can be achieved, for example, by simultaneous introduction through two locks which are arranged in close proximity to one another and/or by coordinated alternate, in particular sequential, introduction. Alternatively or additionally, however, the first reaction zone 2 can also be equipped with a mixing device, in particular a mechanical mixing device, for mixing the starting material with the heat transfer medium.

By this, the starting material, which, if applicable, is preheated, is heated to the pyrolysis temperature and thermally decomposes with the formation of pyrolysis coke and a pyrolysis gas, whereby the latter is fed into the second reaction zone 3, where it is converted into a product gas, which is in turn fed into the third reaction zone 4. Details of this are described below in connection with FIGS. 2 and 3.

In a preferred manner, the pyrolysis coke, together with the heat transfer medium, is discharged into a separation zone 6 in order to separate the pyrolysis coke from the heat transfer medium. In this context, the separation zone 6 can be arranged below the first reaction zone 2 so that the mixture of pyrolysis coke and heat transfer medium can be transferred from the first reaction zone 2 into the separation zone 6 by utilizing the force of gravity.

The separation zone 6 can, for example, have a mechanical screen arrangement that is set up for screening. The heat transfer medium, preferably a bulk material with shape-retaining particles, such as steel balls or ceramic balls, with a defined, narrow range of particle size distribution, can be drawn off as coarse material, while the pyrolysis coke is preferably drawn off as fine material. It is also conceivable to configure the separation zone 6 in such a way that wind sifting of the heat transfer medium can be carried out.

The pyrolysis coke separated from the heat transfer medium is conveyed by a first conveying device 10, such as a screw conveyor or a different conveying device which is suitable for operation at high temperatures, to the third reaction zone 4, where it is converted into activated carbon by the product gas also transferred into the third reaction zone 4. Here, the heat energy which is required in the course of the activation of the pyrolysis coke is preferably provided by the product gas, which is conveyed as a product gas stream, in a preferred manner as a continuous product gas stream, from the second reaction zone 3 through the third reaction zone 4. Therefore, the third reaction zone 4 is advantageously arranged in the vicinity of the second reaction zone 3, in particular directly adjacent to the second reaction zone 3, so that the product gas only has to cover a short distance and does not cool down, or cools down only insignificantly, in the process. The first conveying device 10 can therefore be set up to transfer the pyrolysis coke against the force of gravity from the first reaction zone 2, in particular from the separation zone 6, to the third reaction zone 4.

Further details regarding the activation of the pyrolysis coke in the third reaction zone 4 are explained in connection with FIG. 4.

In the course of the conversion of the pyrolysis coke into activated carbon, pyrolysis coke particles and/or activated carbon particles may enter the product gas stream and may be discharged together with the product gas after the activation. In order to remove this contamination from the product gas stream before further use of the product gas, the pyrolysis coke particles and/or the activated carbon particles can be filtered out in a separating device 12. The separating device 12 is constructed, for example, as a cyclone in which the particles contained in the product gas are separated by centrifugal force. When compared with a purely chemical purification of the product gas, this has the advantage, among other things, that the particles which have been filtered out can be transferred back into the third reaction zone 4.

The activated carbon produced is subsequently transferred to an after-treatment facility 7, where the activated carbon is prepared for its further use, for example by an HCl wash.

The heat transfer medium separated from the pyrolysis coke in the separation zone 6 is transferred via a further, second conveying device 9, such as a bucket elevator or a container elevator, to a heating zone 8, in which the heat transfer medium is brought to a generation temperature which is necessary or at least advantageous for the generation of the product gas from the pyrolysis gas. In this context, the second conveying device 9 can be set up to preheat the conveyed heat transfer medium so that the generation temperature can be reached more easily.

Since, in a preferred manner, the heat transfer medium is to be transferred from the heating zone 8 to the second reaction zone 3 by utilizing the force of gravity, the heating zone 8 is preferably arranged above the second reaction zone 3. The further conveying device can therefore also be set up to transfer the heat transfer medium against the force of gravity from the first reaction zone 2, in particular from the separation zone 6, into the heating zone 8.

The heat transfer medium passes through the heating zone 8, preferably as a moving bed driven by the force of gravity, and hot flue gas flows around it in the process, in particular in a countercurrent manner. By this, the heat transfer medium can be heated up to the generation temperature. The hot flue gas can, for example, be generated by a heating device 11 and can be fed from the heating device 11 via a connection indicated as a dashed line into the heating zone 8.

The heating device 11 can be constructed, for example, as a multi-component burner in which one or more different fuels can be burned. These fuels are preferably provided external to the device 1. In one embodiment, however, the fuel can be formed, at least in part, by a portion of the pyrolysis coke produced in the first reaction zone 2, which pyrolysis coke is drawn off, in particular after the separation from the heat transfer medium in the separation zone 6, and fed to the heating device 11, optionally with one or more further external fuels. Alternatively or additionally, a portion of the product gas can also be burned in the heating device. These possibilities are indicated by dashed arrows.

Figure 2:
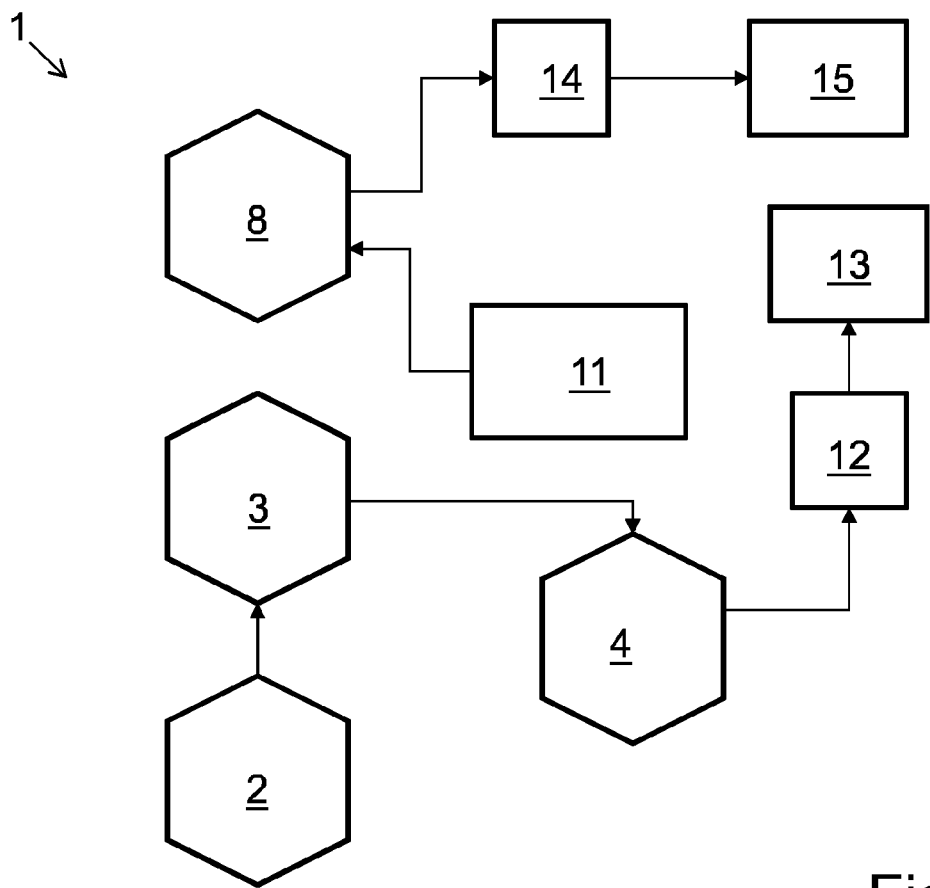
FIG. 2 is a schematic view of a second embodiment of a device for producing activated carbon.

FIG. 2 shows a second example embodiment of a device 1 for producing activated carbon. The device 1 shown substantially corresponds to the device described in connection with FIG. 1. However, here, conveying paths of gases, in particular those of volatile reactants or products, between the individual components of the device 1 are indicated by arrows.

The carbonaceous starting material fed to the first reaction zone 2 is thermally decomposed to produce pyrolysis coke and pyrolysis gas, and, in a preferred manner, the pyrolysis gas generated by this rises into the second reaction zone 3, which is connected to the first reaction zone 2 in a gas-conducting manner. Here, the gas-conducting connection between the first and the second reaction zone 2, 3 is preferably provided, in addition to the lock described in connection with FIG. 1, through which the heat transfer medium is introduced from the second reaction zone 3 into the first reaction zone 2, in order to permit unhindered outflow of the gas from the first reaction zone. The heat transfer medium, on the other hand, can be introduced sequentially, or in a metered manner, from the second to the first reaction zone 3, 2 through the lock.

In the second reaction zone 3, the pyrolysis gas preferably flows through a bed of heat transfer medium which is heated to a generation temperature for generating product gas from pyrolysis gas, in particular for cracking tars contained in the pyrolysis gas. When flowing through the heat transfer medium, the pyrolysis gas is converted into the product gas. Further details regarding the generation of the product gas are described further below in connection with FIG. 3.

To ensure a complete conversion of the pyrolysis gas into a product gas which can be used to activate the pyrolysis coke in the third reaction zone 4, water vapor is added to the pyrolysis gas in a preferred manner. The adding of the water vapor can take place in the first reaction zone 2, so that the thermal decomposition, i.e. the conversion of the carbonaceous starting material into pyrolysis coke and pyrolysis gas, can take place in the presence of water vapor, in particular in an atmosphere containing water vapor. This has the advantage that the pyrolysis coke is already partially activated, so that, in the third reaction zone 4, it can more easily be converted completely into activated carbon and/or activated carbon of an even higher quality can be produced.

The product gas generated in this way in the second reaction zone 3, in particular the low-tar and/or hydrogen-rich product gas, which is preferably present at the generation temperature between 700 and 1200° C., preferably between 800 and 1000° C., in particular between 925 and 975° C., is conveyed to the third reaction zone 4, which is connected to the second reaction zone 3 in a gas-conducting manner. In order to ensure that the temperature of the product gas does not drop, or at least does not significantly drop, during the transfer, the conveying path for the product gas between the second and the third reaction zone 3, 4 is kept as short as possible, for example by the third reaction zone 4 being arranged immediately adjacent to the second reaction zone 3. Alternatively or additionally, the gas-conducting connection between the second and the third reaction zone 3, 4 can be thermally insulated.

In order to enable the product gas to be transferred in a simple manner, the third reaction zone 4 can furthermore be arranged at least slightly above the second reaction zone 3, so that i.e. product gas can passively rise into the third reaction zone 4. Alternatively or additionally, however, it is also conceivable to provide a suitable active conveying device, such as a fan, in order to ensure the flow of product gas from the second to the third reaction zone 3, 4 and, if applicable, also the flow of pyrolysis gas from the first to the second reaction zone 2, 3. Due to the high temperatures in this area of the device 1, the conveying device can also be arranged further downstream, in particular downstream of the third reaction zone 4, where the product gas has already cooled down.

In the third reaction zone 4, the product gas comes into contact with the pyrolysis coke which has also been transferred to the third reaction zone 4 and which is thereby processed into activated carbon. The product gas can subsequently be used further, for example combusted in a combined heat and power plant in order to generate energy. Prior to this, however, the product gas should be purified, in particular by a physical device, by a separating device 12, which has already been explained in detail in connection with FIG. 1. In addition, a purification device 13 can be provided which is set up for the further purification, in particular chemical purification, of the product gas, if applicable in dependence upon the intended further use of the product gas.

In order to heat the heat transfer medium to the generation temperature, a heating device 11 can be provided, as has already been explained in connection with FIG. 1, which heating device 11 is connected to the heating zone 8 in a heat-conducting manner. The heat energy generated by the heating device 11 can, if applicable additionally and/or at least partially, be provided in the form of hot combustion exhaust gases in the heating zone 8. In this context, the combustion exhaust gases are preferably guided in a countercurrent manner with respect to the heat transfer medium, in particular through a bed of the heat transfer medium at the base of the heating zone 8, and escape in an upper region of the heating zone 8.

Since the heat transfer medium is transferred from the first reaction zone 2, if applicable from a separation zone (see FIG. 1), to the heating zone 8 already at a base temperature of more than 500° C., the combustion exhaust gases have, as a rule, a residual temperature in the region of the base temperature, which can be utilized in a heat recovery device 14, such as a heat exchanger. If necessary, the exhaust gases are further fed to an exhaust gas purification device 15, where they can be purified by physical and/or chemical elements, for example in view of limit values prescribed by law, and subsequently ejected.

Figure 3:
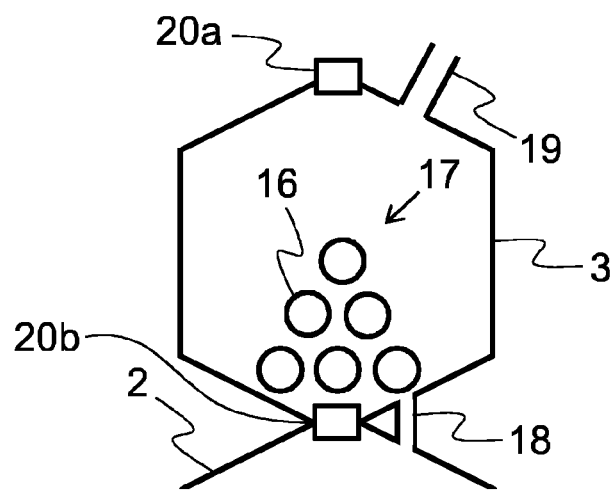
FIG. 3 is a detailed view of an embodiment of a second reaction zone.

FIG. 3 shows an example embodiment of a second reaction zone 3, through which a pyrolysis gas flows which is generated in a first reaction zone 2 which is arranged below the second reaction zone 3, which pyrolysis gas is, in the process, converted into a product gas for activating pyrolysis coke.

The generation of the product gas from the pyrolysis gas takes place at a generation temperature which is above the pyrolysis temperature which is required to generate the pyrolysis gas from a carbonaceous starting material. The generation temperature is achieved by filling the second reaction zone 3 with a preheated heat transfer medium 16, which is preferably provided in the form of a bulk material, such as steel balls or ceramic balls, and which accumulates at the base of the second reaction zone 3 in the form of a bed 17.

The pyrolysis gas enters the second reaction zone 3 via a gas-conducting connection 18 between the first and the second reaction zone 2, 3, whereby the gas-conducting connection 18 opens into the second reaction zone 3 in an upper region of the first reaction zone 2, and in a lower region, in particular in the region of the base, of the second reaction zone 3. In this way, the hot pyrolysis gas which has been heated to the pyrolysis temperature can simply rise, can be transferred into the second reaction zone 3, can, there, flow through the bed 17 and can, in the process, be heated to the higher generation temperature and can be discharged as product gas from the second reaction zone 3 through a product gas discharge line 19, which is advantageously arranged in the upper region of the second reaction zone 3, and can be transferred to a third reaction zone (see FIG. 1).

The heat transfer medium 16, which has been preheated to the generation temperature, enters the second reaction zone 3 in the upper region of the second reaction zone 3, for example through a first bulk material lock 20a, whereby, in this context, the heat transfer medium 16 can be introduced into the second reaction zone 3, preferably in a metered manner by the first bulk material lock 20a, in particular in a cyclical manner. By the force of gravity, the second heat transfer medium falls into the second reaction zone 3. By the second bulk material lock 20b, the heat transfer medium 16, in the meantime cooled down to the pyrolysis temperature, in particular due to the, preferably continuous, flow of the cooler pyrolysis gas through the bed 17, can be transferred into the first reaction zone 2 while again making use of the force of gravity, whereby, here, metering of the heat transfer medium 16 can also take place.

Here, in a preferred manner, the gas-conducting connection 18 leads around the second bulk material lock 20b in order to make an unhindered transfer of the pyrolysis gas from the first to the second reaction zone 2, 3 possible even when the second bulk material lock 20b is closed. Here, the opening of the gas-conducting connection 18 into the second reaction zone 3 is arranged in the second reaction device in such a way that the pyrolysis gas emerging therefrom flows through the bed 17 at the base of the second reaction zone 3. This can ensure that the pyrolysis gas is completely heated to the generation temperature and that, for example, tars contained in the pyrolysis gas are cracked so that a low-tar product gas is obtained.

Figure 4:
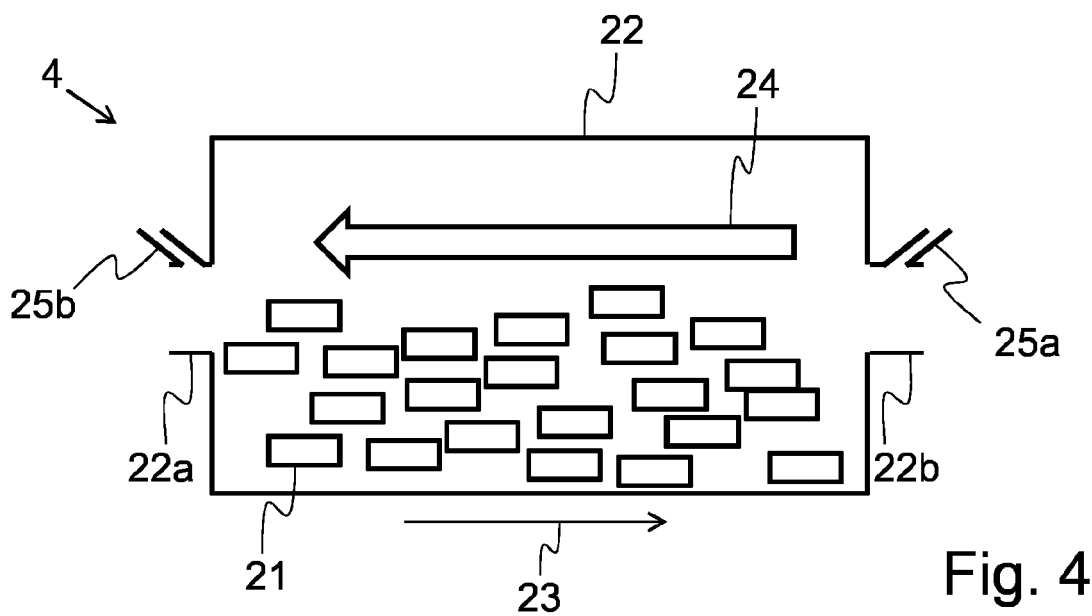
FIG. 4 is a detailed view of an embodiment of a third reaction zone.

FIG. 4 shows an example embodiment of a third reaction zone 4 for producing activated carbon from pyrolysis coke 21 with the aid of a product gas. Here, the third reaction zone 4 is constructed as a rotary drum reactor with a drum 22, into which the pyrolysis coke 21 can be introduced via an entry region 22a and discharged as activated carbon via an exit area 22b. In this context, the drum 22 is rotatably mounted so that mixing of the pyrolysis coke 21 within the drum 22 is made possible.

Here, the conveying of the pyrolysis coke 21 from the entry region 22a to the exit region 22b along a conveying direction 23 can at least be assisted by the rotation of the drum 22, in particular if the third reaction zone 4 is tilted with respect to a horizontal, so that the exit region 22b lies below the entry region 22a.

Here, the product gas in the form of a product gas stream 24 flows through the third reaction zone 4 in the opposite direction to the conveying direction 23. In this way, in particular in conjunction with the rotation of the drum 22, the product gas comes into complete contact with the pyrolysis coke 21 so that a complete and uniform conversion to activated carbon can take place.

Here, in a preferred manner, the product gas enters the third reaction zone 4 through an inlet opening 25a in the exit region 22b and exits the third reaction zone 4 through an outlet opening 25b in the entry region 22a. The inlet opening 25a is connected to a second reaction zone in a gas-conducting manner (see FIG. 2), so that product gas can be provided, at least substantially continuously, in the third reaction zone 4. The outlet opening 25b is preferably connected to a separating device in a gas-conducting manner (see FIG. 1), in which separating device the product gas stream 24 can be cleaned of pyrolysis coke particles and/or activated carbon particles which have been picked up in the drum 22 in the course of it flowing around the pyrolysis coke 21. The pyrolysis coke particles and/or activated carbon particles which have been separated from the product gas stream 24 can be fed back to the third reaction zone 4 via the entry region 22a.

Preferably, the temperature in the third reaction zone 4 for activating the pyrolysis coke 21 is controlled exclusively by the product gas entering the drum 22 via the inlet opening 25a. In other words, in a preferred manner, the activation temperature at which the pyrolysis coke 21 is activated corresponds, at least substantially, to a generation temperature at which pyrolysis gas generated in the course of a thermal decomposition is converted into the product gas.

Alternatively or additionally, a zone heater (not shown) may be provided, which is arranged to provide heat and to introduce the generated heat into the third reaction zone 4. One or more different fuels may be burned in the zone heater. Preferably, these fuels are provided external to the device. However, in one embodiment, the fuel may be formed, at least in part, from a portion of the pyrolysis coke generated in the first reaction zone. Alternatively or additionally, a portion of the product gas may be burned in the zone heater.

Figure 5:
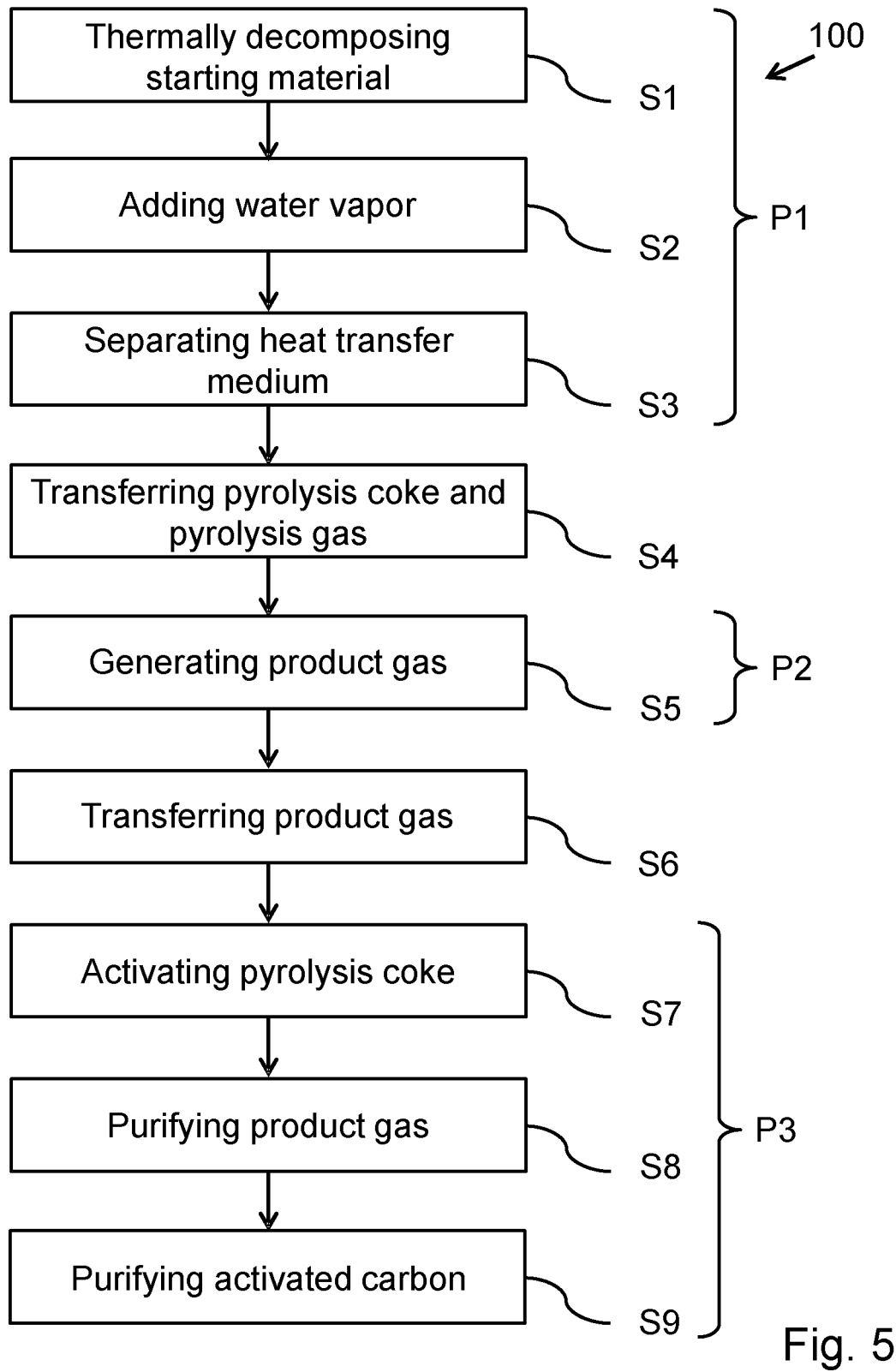
FIG. 5 is a flowchart illustrating an embodiment of a method for producing activated carbon.

FIG. 5 shows a preferred example embodiment of a method 100 for producing activated carbon. In a method step S1, a carbonaceous starting material, for example biomass or similar biogenic waste materials generated in households and/or industrial processes, is thermally decomposed in a first reaction zone into pyrolysis coke and pyrolysis gas.

In order to drive the decomposition process, a preheated heat transfer medium can be supplied to the first reaction zone, which preheated heat transfer medium ensures a defined pyrolysis temperature in the first reaction zone. To enable the starting material to decompose as completely and homogeneously as possible, the heat transfer medium is preferably provided as a bulk material, i.e. as shape-retaining particles, such as steel balls or ceramic balls, with a diameter of between 0.1 and 200 mm, preferably of between 1 and 100 mm, in particular of between 10 and 50 mm. The heat transfer medium can therefore advantageously mix with the starting material.

In order to control the temperature in the first reaction zone, the first reaction zone the heat transfer medium can preferably be fed into the first reaction zone in a metered manner, in particular by a bulk material lock. If the temperature in the first reaction zone drops over time, for example due to the progressing decomposition of the starting material, further hot heat transfer medium can be supplied accordingly.

In order to facilitate a subsequent activation of the pyrolysis coke, water vapor can be added, in a further method step S2, to the pyrolysis gas produced. In this context, the water vapor is preferably added in the first reaction zone. In this way, a partial activation of the pyrolysis coke is achieved directly as it is formed.

After the pyrolysis coke has been produced, the heat transfer medium should be separated from the pyrolysis coke again. Preferably, the mixture is therefore separated in a separation zone in a further method step S3, for example by mechanical screening or wind sifting.

The thermal decomposition of the starting material, the adding of the carrier material in a metered manner into the first reaction zone, the adding of water vapor and the separating of the heat transfer medium are preferably part of a first process stage P1, which, in a preferred manner, includes all method steps which are carried out within, or at least corresponding with, the first reaction zone.

In a further method step S4, the pyrolysis gas generated is transferred to a second reaction zone and the pyrolysis coke generated is transferred to a third reaction zone. While the transfer of the pyrolysis gas is preferably achieved via a gas conduit which opens into the first and second reaction zones, through which gas line the pyrolysis gas can escape from the first reaction zone into the second reaction zone, a first conveyor device, for example a conveyor belt or a screw conveyor, can be provided for the transfer of the pyrolysis coke.

In a further method step S5, the pyrolysis gas is converted into a product gas in the second reaction zone which product gas can be used to activate the pyrolysis coke. For this purpose, the pyrolysis gas is preferably heated to a generation temperature which is above the pyrolysis temperature in the first reaction zone, so that tars contained in the pyrolysis gas are cracked. For example, the pyrolysis gas may be passed through a bed of the heat transfer medium at the base of the second reaction zone. In particular, the pyrolysis gas may be passed through the second reaction zone in a countercurrent manner with respect to the heat transfer medium before it leaves the second reaction zone in an upper region thereof.

In this context it is also conceivable to provide a catalyst in the upper part of the second reaction zone, which catalyst at least promotes the generation of the product gas from the pyrolysis gas.

In order to control the temperature in the second reaction zone, the heat transfer medium which has been preheated in a heating zone is introduced, in a preferred manner, into the second reaction zone in a metered manner, for example via a bulk material lock in the upper region of the second reaction zone, whereby it forms the bed in the second reaction zone. If, for example, the temperature in the second reaction zone drops, additional hot heat transfer medium can be added from above, while heat transfer medium at the base of the second reaction zone that has already cooled down can be transferred to the first reaction zone.

In this context, the generation temperature is preferably selected in such a way that not only a complete conversion of the pyrolysis gas into hydrogen-rich, low-tar product gas is ensured, but also that a particularly reliable activation of the pyrolysis coke is possible at this temperature.

If the water vapor content in the product gas is not sufficiently high, for example because only as much water vapor was added in the first reaction zone as is necessary for a partial activation of the pyrolysis coke, additional water vapor can optionally be added in the second reaction zone. Preferably, this additional water vapor is added in the region of the gas conduit between the first reaction zone and the second reaction zone, before the pyrolysis gas comes into contact with the hot heat transfer medium in the second reaction zone.

The generation of the product gas, the feeding of the carrier material into the second reaction zone in a metered manner and the adding of further water vapor are preferably part of a second process stage P2, which, in a preferred manner, includes all method steps which are carried out within, or at least corresponding with, the second reaction zone.

In a further method step S6, the product gas generated is transferred into the third reaction zone. In the course of this, the temperature of the product gas is preferably kept stable. For example, the temperature drops by less than 100° C., preferably less than 50° C., in particular less than 25° C., during the transfer into the third reaction zone when compared with the generation temperature.

In a further method step S7, the pyrolysis coke is subjected to the hot product gas fed into the third reaction zone in order to achieve activation of the pyrolysis coke. For this purpose, the pyrolysis coke can for example be conveyed through the third reaction zone, for example by a conveyor belt or by sliding due to the force of gravity, while the hot product gas sweeps over the pyrolysis coke or flows around the pyrolysis coke. In order to enable the best possible heat transfer, the product gas is preferably conveyed through the third reaction zone in a countercurrent manner with respect to the pyrolysis coke.

In a preferred manner, the pyrolysis coke is mixed in the process, preferably with the pyrolysis gas, in particular. For this purpose, the third reaction zone can be constructed, for example, as a rotary drum reactor, whereby the pyrolysis coke passes through a rotatable drum of the reactor. In addition to the mixing, the rotary motion, in particular if the axis of rotation of the drum is inclined with respect to a horizontal, can bring about, or at least support, the transport of the pyrolysis coke through the third reaction zone.

In a preferred manner, in a further method step S8, the product gas is purified after the activation of the pyrolysis coke, in particular by a physical device. For this purpose, the pyrolysis gas can pass through a separating device in which particles which have been picked up by the product gas in the course of the activation are removed therefrom again. Thereafter, the product gas which has been purified in this way by the physical device can be subjected to further, chemical purification steps before it is used in terms of its energy content or as a material source.

The activated carbon is also preferably cleaned, in particular by a chemical element, before it is used further. For this purpose, in a further method step S9, the activated carbon can be transferred from the third reaction zone to an after-treatment facility and can be treated there, in particular in accordance with the intended use.

The activation of the pyrolysis coke, the purification of the product gas and the treatment of the activated carbon are preferably part of a third process stage P3, which, in a preferred manner, includes all method steps which are carried out within, or at least corresponding with, the third reaction zone.

While at least one example embodiment has been described above, it is to be noted that a large number of variations thereto exist. It should also be noted that the example embodiments described herein only illustrate non-limiting examples, and that it is not intended thereby to limit the scope, the applicability, or the configuration of the devices and methods described herein. Rather, the preceding description will provide the person skilled in the art with instructions for implementing at least one example embodiment, whereby it is to be understood that various changes in the functionality and the arrangement of the elements described in an example embodiment can be made without deviating from the subject matter respectively set forth in the appended claims as well as its legal equivalents.

What is claimed is:

1. A method for producing activated carbon within a gasification process, the method comprising:
    a first process stage comprising thermally decomposing a carbonaceous starting material in a first reaction zone, to produce pyrolysis coke and pyrolysis gas;
    transferring at least a portion of the produced pyrolysis gas from the first reaction zone to a second reaction zone and transferring at least a portion of the pyrolysis coke from the first reaction zone to a third reaction zone;
    a second process stage comprising generating, from the pyrolysis gas in the second reaction zone, a product gas which can be used for activating the pyrolysis coke;
    transferring the product gas to the third reaction zone; and
    a third process stage comprising activating at least a portion of the pyrolysis coke to form activated carbon using the product gas in the third reaction zone;
    wherein water vapor is added to the pyrolysis gas, such that the product gas is generated in the second reaction zone; and
    wherein the water vapor is added and/or a generation temperature during generation of the product gas is chosen in such a way that the product gas comprises at least one of the following:
        a water vapor content of between 15% and 45% by volume;
        a carbon dioxide content of between 5% and 30% by volume; and/or
        a carbon monoxide content of between 10% and 30% by volume.

2. The method of claim 1, wherein the pyrolysis coke is activated at an activation temperature that is dependent on the generation temperature during generation of the product gas.

3. The method of claim 1, wherein at least a portion of the pyrolysis coke is preconditioned during the transfer to the third reaction zone.

4. The method of claim 1, wherein the pyrolysis coke is continuously mixed with the product gas in the third reaction zone during activation.

5. The method of claim 1, wherein the product gas is conveyed through the third reaction zone in a countercurrent manner with respect to the pyrolysis coke.

6. The method of claim 1, wherein, after activation of the pyrolysis coke, the product gas is passed through a separating device, where it is purified to remove pyrolysis coke residues and/or activated carbon residues.

7. The method of claim 1, wherein a portion of the pyrolysis coke is combusted in a heating device to heat a heat transfer medium that is supplied to the second reaction zone for generation of the product gas and/or supplied to the first reaction zone for thermal decomposition of the starting material.

8. The method of claim 1, wherein the water vapor is added and/or the generation temperature is chosen in such a way that the product gas comprises at least one of the following:
    a water vapor content of between 20% and 40% by volume;

a carbon dioxide content of between 10% and 20% by volume; and/or a carbon monoxide content of between 15% and 25% by volume.

9. The method of claim 1, wherein the water vapor is added and/or the generation temperature is chosen in such a way that the product gas comprises at least one of the following:

a water vapor content of about 30% by volume;

a carbon dioxide content of about 15% by volume; and/or a carbon monoxide content of about 20% by volume.

10. The method of claim 1, wherein a heat energy which is required for activation of the pyrolysis coke is provided at least in part by the product gas.

11. The method of claim 10, wherein the pyrolysis coke is activated at an activation temperature that is dependent on the generation temperature during generation of the product gas, wherein the generation temperature is between 925° C. and 975° C., wherein at least a portion of the water vapor is already added in the first reaction zone during thermal decomposition, so that partially activated pyrolysis coke is produced which is at least substantially completely activated in the third reaction zone using the product gas, wherein the pyrolysis coke is partially activated using the added water vapor in the first reaction zone at a temperature which is defined by a pyrolysis temperature at which the starting material is thermally decomposed, wherein the starting material is thermally decomposed in the first reaction zone at a pyrolysis temperature that is between 650° C. and 750° C., wherein at least a portion of the pyrolysis coke is preconditioned during the transfer to the third reaction zone;

wherein the pyrolysis coke is at least substantially continuously mixed with the product gas in the third reaction zone during activation, wherein the product gas is conveyed through the third reaction zone in a countercurrent manner with respect to the pyrolysis coke, wherein, after activation of the pyrolysis coke, the product gas is passed through a separating device, where it is purified by physical means to remove pyrolysis coke residues and/or activated carbon residues, wherein a portion of the pyrolysis coke is combusted in a heating device to heat a heat transfer medium that is supplied to the second reaction zone for generation of the product gas and/or supplied to the first reaction zone for thermal decomposition of the starting material.

12. The method of claim 1, wherein the generation temperature is between 700° C. and 1200° C.

13. The method of claim 12, wherein the generation temperature is between 925° C. and 975° C.

14. The method of claim 1, wherein at least a portion of the water vapor is already added in the first reaction zone during thermal decomposition, so that partially activated pyrolysis coke is produced which is at least predominantly activated in the third reaction zone using the product gas.

15. The method of claim 14, wherein the pyrolysis coke is partially activated using the added water vapor in the first reaction zone at a temperature which is defined by a pyrolysis temperature at which the starting material is thermally decomposed.

16. The method of claim 15, wherein the starting material is thermally decomposed in the first reaction zone at a pyrolysis temperature that is between 500° C. and 900° C.

17. The method of claim 16, wherein the starting material is thermally decomposed in the first reaction zone at a pyrolysis temperature that is between 650° C. and 750° C.

18. A device for producing activated carbon, wherein the device is configured to carry out the method of claim 1.

19. The device of claim 18, comprising:

a first reaction zone in which pyrolysis coke and pyrolysis gas can be produced by thermal decomposition of carbonaceous starting material;

a second reaction zone which is connected to the first reaction zone in a gas-conducting manner and in which a product gas which can be used for activation of the pyrolysis coke is generated from at least a portion of the pyrolysis gas;

a third reaction zone which is connected to the second reaction zone in a gas-conducting manner and in which at least a portion of the pyrolysis coke can be activated using the product gas to form activated carbon; and a first conveying device which is arranged to transfer at least a portion of the pyrolysis coke from the first reaction zone to the third reaction zone.

* * * * *